United States Patent [19]
Tondi-Resta et al.

[11] Patent Number: 5,509,097
[45] Date of Patent: Apr. 16, 1996

[54] OPTICAL FIBER CORE AND CABLE WITH REINFORCED BUFFER TUBE LOOSELY ENCLOSING OPTICAL FIBERS

[75] Inventors: Jose L. Tondi-Resta, Columbia; Ben H. Wells, Irmo; James J. Waring, Jr., Lexington, all of S.C.

[73] Assignee: Pirelli Cable Corporation, Lexington, S.C.

[21] Appl. No.: 224,030

[22] Filed: Apr. 7, 1994

[51] Int. Cl.$^6$ .................................................. G02B 6/44
[52] U.S. Cl. .......................... 385/113; 385/109; 385/114; 385/112
[58] Field of Search .................................. 385/109, 110, 385/112, 113, 114, 106

[56] References Cited

U.S. PATENT DOCUMENTS

| | | | |
|---|---|---|---|
| 4,166,670 | 9/1979 | Ramsay | 385/113 |
| 4,730,894 | 3/1988 | Arroyo | 385/111 X |
| 4,844,575 | 7/1989 | Kinard et al. | 385/113 |
| 4,909,592 | 3/1990 | Arroyo et al. | 385/113 |
| 5,125,061 | 6/1992 | Marlier et al. | 385/113 X |
| 5,125,063 | 6/1992 | Panuska et al. | 385/113 |
| 5,138,685 | 8/1992 | Arroyo et al. | 385/113 |
| 5,384,880 | 1/1995 | Keller et al. | 385/113 X |

*Primary Examiner*—Rodney B. Bovernick
*Assistant Examiner*—Hemang Sanghavi
*Attorney, Agent, or Firm*—Brooks Haidt Haffner & Delahunty

[57] ABSTRACT

Optical fiber core including a plastic buffer tube loosely containing individual optical fibers or a plurality of coplanar fibers in a plastic ribbon, which fibers and ribbon are longer than the buffer tube, at least two flexible strength members of a tensile strength greater than the tensile strength of the tube and having a coefficient of expansion and contraction less than that of the tube, at the outer surface of the tube and an adhesive binding the strength members to the tube and/or a tape or cord under tension around the strength members to prevent slippage of the strength members with respect to the tube and to prevent buckling of the strength members when the core is subject to compressive forces. Also, an optical fiber cable containing such core.

37 Claims, 4 Drawing Sheets

OPTICAL FIBER CORE AND CABLE WITH REINFORCED BUFFER TUBE LOOSELY ENCLOSING OPTICAL FIBERS

FIELD OF THE INVENTION

The invention relates to an optical fiber cable core containing optical fibers and a cable including such core in which the core is reinforced by strength members providing sufficient tensile strength for axial pulling as well as adequate resistance to compression of the core so that the core may be handled without damage prior to incorporation in the cable and so that the core remains similarly protected after it is incorporated in a cable and during its intended useful life.

BACKGROUND OF THE INVENTION

It is well known in the art that optical fibers, e.g. silica fibers with claddings and coatings for optical and mechanical purposes, are relatively fragile and must be protected during manufacture of an optical fiber cable and the installation of such a cable. Thus, the fibers must not be bent below a pre-determined radius and not be subjected to excessive pulling or tensile forces or compression forces. In addition, such fibers are subjected to deterioration in the presence of moisture and must be protected from moisture as well.

In the past, the optical fibers have been loosely enclosed in a plastic tube (buffer tube) having a bore of a cross-sectioned area larger than the cross-sectional area of the fibers or the cross-sectional area of the fibers with the coatings including a plastic which forms a ribbon incorporating a plurality of fibers. Frequently, the axial length of the tube is shorter than the linear length of the fibers or ribbons, and has sufficient tolerance so that stretching or contraction of the tube, which has a relatively high temperature coefficient of expansion and which has a relatively low tensile strength, will not damage the enclosed fibers. Of course, with such construction the tube is able to move axially with respect to the fibers, but the relative axial lengths of the tubes and fibers are selected so that the interior of the tube is not in continuous contact with the fibers or ribbons and so that the fibers are not bent to a too small radius.

For moisture protection, the tube is filled with a water blocking compound of a known type which is sufficiently fluid as not to prevent, significantly, movement of the fibers or ribbons with respect to the tube. Typically, the water blocking compound is a gel or grease-like and non-hygroscopic and/or thixotropic.

While such a tube-optical fiber combination called a "core", provides some protection for the fibers, it usually is not installed in the field for optical communication purposes because of its fragileness and inability to tolerate pulling and bending forces encountered in such installation operations. In further manufacturing steps, additional layers of materials, such as armoring for crushing and rodent protection, strength members to resist pulling and compression forces and a plastic jacket for weather and abrasion purposes are applied to the core. During such further manufacturing steps, the optical fibers must also be protected against damage by mechanical force and moisture.

As strength members, metal wires or high stength non-metallic rods or fibers, such as glass rods or fibers or aramid in matrix of resin or similar materials have been applied to the exterior surface of the core tube in various configurations, for example, helically or longitudinally, with or without circumferential or axial spacing. Such strength members usually have a relatively small cross-sectional area and without lateral support, are easily bent when subjected to compression forces longitudinally thereof. While such strength members provide adequate axial tensile strength, normally, without additional means of support, they provide little resistance to axial compression forces applied to the cable or the core, such as externally thereto or by reason of thermal contraction. It has been proposed that the strength members be made of non-metallic fibers impregnated with an epoxy resin to make the strength members rigid and to resist axial compression forces as well as axial tensile forces. However, such latter strength members make the core and subsequent cable relatively stiff or rigid which is undesirable and they cannot withstand relatively large longitudinal compression forces without undesirable bending, buckling or kinking.

A problem in the design of optical fiber cables is that in many cases, the cables are required to be operable, without damage to the optical fibers, over a temperature range of about $-50°$ C. to about $85°$ C. although for special situations, the range can be from about $-10°$ to about $65°$ C. Plastics which are normally used for the cable jacket and the buffer tube have a relatively high temperature coefficient of expansion and contraction and a relatively low tensile strength whereas the optical fibers have a relatively low temperature coefficient of expansion and contraction. In order to prevent the plastic components from applying stress to the optical fibers, the optical fibers are decoupled from the plastic components, such as by making the cross-sectional area of the bore of the buffer tube larger than the cross-sectional area of the optical fibers, by making the linear or longitudinal length of the optical fibers greater than the axial length of the buffer tube and by including in the cable, strength members which have some resistance to contraction of the cable, as aforesaid.

However, it has been found that these measures are not sufficient because depending upon the ratio of the cross-sectional area of the bore of the buffer tube to the cross-sectional area of the optical fibers, the ratio of the excess length of the optical fibers to the length of the buffer tube, the temperature coefficients and thickness of the plastic components, the coupling between the strength members and the plastic components and the tensile strength and compression resistance of the strength members, the optical fibers can still be damaged by reason of stretching and contraction of the plastic components because while the strength members of the prior art which are of small diameter, can, with sufficient coupling to the plastic components, provide adequate protection for the optical fibers with expansion and pulling forces, they cannot provide adequate protection with respect to contraction forces because of the ease with which the strength members can bend or kink with contraction forces. In fact it has been found that with prior art thicknesses of jacket plastic materials, the strength members can pierce the outer jacket with conventional temperature changes thereby rendering the cable unsuitable for further use.

It is, of course, possible to increase the diameters or number of strength members to increase the resistance of the cable to contraction forces, but unless the diameters are increased significantly, thereby significantly increasing the cable diameter, or causing other problems, e.g. manufacturing problems, or resistance to contraction forces cannot be obtained.

When the strength members are merely laid on the surface of the core tube longitudinally or are so laid with a tape or cord merely to hold them in place, the strength members do not provide the desired compression resistance even when the strength members are surrounded by a metal shield or plastic jacket. Thus, when the strength members are subjected to longitudinal compression forces, they slide axially with respect to the core tube, jacket on other components and/or kink or buckle. When this happens, the core tube and hence, the optical fibers are subject to damage. Such kinking or buckling can be sufficient to tear or pierce layers around the strength members.

BRIEF SUMMARY OF THE INVENTION

We have found that strength members of small diameter can be employed in an optical fiber core and an optical fiber cable, whereby a cable of conventional size can be provided, by providing transverse or lateral support to the strength members which is greater than that provided in prior art cables and which permits the core, or a cable including such core, to provide full protection for the optical fibers under the normal temperature conditions and expected internal and external longitudinal tensile and compression forces.

The optical fiber core of the invention comprises a plastic buffer tube loosely containing optical fibers, as individual optical fibers unsecured to each other but preferably in a plurality of plastic ribbons, each ribbon containing a plurality of optical fibers held in fixed, side-by-side relation to each other by the plastic of the ribbon. The axial length of the fibers or ribbons is greater than the axial length of the buffer tube. Any otherwise empty spaces within the tube are filled with a water blocking material, such as a thixotropic gel.

Applying radially inward force to the outer surface of the buffer tube are two or more strength members which extend parallel, or substantially parallel, to the longitudinal axis of the tube. The strength members have a high tensile strength, several times the tensile strength of the tube and a temperature coefficient of expansion and contraction significantly lower than such coefficient of the buffer tube, and can, for example, be stainless steel wires or carbon steel wires coated with copper or zinc to resist corrosion, flexible polymeric or non-polymeric or glass rods or glass or aramid fibers embedded in a resin, such as an epoxy resin, which provides a unitary structure of small cross-section which is not so rigid that it significantly affects the bendability of the core or a cable including the core.

To increase the ability of such strength members to resist compression forces applied longitudinally or axially, of the core, i.e. their anti-compression performance, and thereby, improve the protection of the optical fibers, the strength members are supported transversely to their lengths and are tightly coupled to the outer surface of the buffer tube so that slippage between the strength members and the buffer tube requires relatively high forces axially of the core. An improvement in compression and slippage resistance can be obtained by merely providing an adhesive, such as an epoxy resin, between at least the adjacent surfaces of the strength members and the buffer tube. However, in preferred embodiments, a cord or tape, either with or without such adhesive so disposed, is tightly wound around the strength members with a tension substantially in excess of the tension required if the cord or tape is provided merely to hold the strength members in place for the subsequent processing of the cable in the application of other layers.

The tensile strength of the cord or tape is selected to withstand any buckling forces of the strength member expected to be caused by the compression forces. Normally, the cord or tape is wound helically around the strength members, and while the cord or tape could be helically wound with abutting turns, this is not necessary for usual compression forces, and it reduces the speed at which the core is formed. Accordingly, and preferably, the cord or tape is wound with axially spaced turns, the spacing being dependent upon the dimensions and bending properties of the strength member, and in any event, the relationship of spacing and properties of the strength members is selected so that the strength members will protect the tube and optical fibers up to the expected maximum of compression forces, both during handling of the core and the subsequent handling and temperature changes during and after the manufacure and installation of a cable including the core. To facilitate processing and performance, the cords or tape may be applied in two or more layers, the cord or tape in one or more layers being wound in the opposite direction with respect to other layers. Also, the layers of cord or tape can be wound with the same or different pitches.

In the cable of the invention, the resistance to compression of the strength members can be enhanced by surrounding the described core with layers of material which, in themselves, may not provide the desired compression resistance but which apply radial pressure to the strength members which aids in preventing buckling or kinking of the strength members when they are subjected to compression.

Thus, the core described, preferably, is encircled by an axially continuous, extruded, first layer of a plastic which, upon cooling, applies radially inward pressure to the entire axial lengths of the strength members. Over such layer of plastic, a metal armor, corrugated or uncorrugated, can be applied by longitudinally folding a tape, such as a steel tape, with overlapping edged portions. Preferably, the tape is coated on one or both sides with a plastic, for corrosion and other purposes, and if the tape is so coated on both sides with a sealable plastic, e.g. sealable by heat, the overlapping edge portions can be sealed together by the plastic to prevent the ingress of moisture. To improve sealing, an adhesive may be applied at the overlap. The armoring can be in more than one layer, and the armoring not only provides crushing and rodent protection but aids in preventing distortion of the plastic layer therewithin and hence, reduction of the radially inward force on the strength members.

The layer of plastic first applied to the strength members can be of sufficient thickness to provide an abrasion resistance and handling characteristics for the cable, and if so, the armor can be omitted. On the other hand, if the cable includes an armoring layer, an outer layer of plastic, forming a jacket or sheath, normally will be extruded over the armoring layer.

When the first layer of plastic is applied over the strength members, it may not completely fill the space between the first layer and the buffer tube. To oppose moisture penetration into any spaces between the first layer and the buffer tube, a water blocking material is introduced between the first layer and the buffer tube during the manufacture of the cable. Such water blocking material can be, but need not be, the same as the water blocking material within the buffer tube. For example, the water blocking material within the buffer tube should not put any significant restraint on movement of the optical fibers or optical fiber ribbons within the buffer tube whereas the water blocking material between the first layer of plastic and the buffer tube does not have the same requirements. Also, it may be desirable that the water blocking material within the buffer tube contain a gas, such as hydrogen, absorbing material whereas this is not a requirement for the water blocking material between the first layer and the buffer tube. Either or both of the water blocking materials can contain water swellable particles.

When the optical fibers are contained in ribbons of plastic, it is easier to bend the ribbons in a direction transverse to the major surface dimension of the ribbons. When only two strength members are used, it is preferred that they be disposed at diametrically opposite positions on the core so that the easier bending direction of the core and the cable is transverse, e.g. 90°, to the easier bending direction of the ribbons whereby the lowered resistance to bending of the ribbons in one direction is at least particularly offset by the resistance to bending of the strength members. A plane intersecting both strength members would be substantially parallel to the major surfaces of the ribbons and preferably, about mid-way of the height of a stack of ribbons. The ribbons may be placed in the buffer tube without any twisting around the buffer tube axis or the stack axis but if desired, the ribbons may follow helical or oscillating (S or Z) lay paths within the buffer tube.

In addition, when the optical fibers within the buffer tube are contained in plastic ribbons, it may be desirable that the bore of the buffer tube be rectangular and have dimensions which will prevent twisting of the stack of ribbons around the axis of the buffer tube. Such a rectangular bore would have dimensions larger than the stack and can be made when the buffer tube is extruded. However, the buffer tube can be made with a bore of circular cross-section and plastic circumferential segments, which fit relatively tightly within the circular bore, and preferably, which interlock, can be inserted in the circular bore and used to provide the rectangular enclosure for the stack of ribbons.

BRIEF DESCRIPTION OF THE DRAWINGS

Other features of the present invention will be more readily understood from the following detailed description of specific embodiments thereof when read in conjunction with the accompanying drawings, in which.

DESCRIPTION OF PREFERRED EMBODIMENTS

Figure 1:
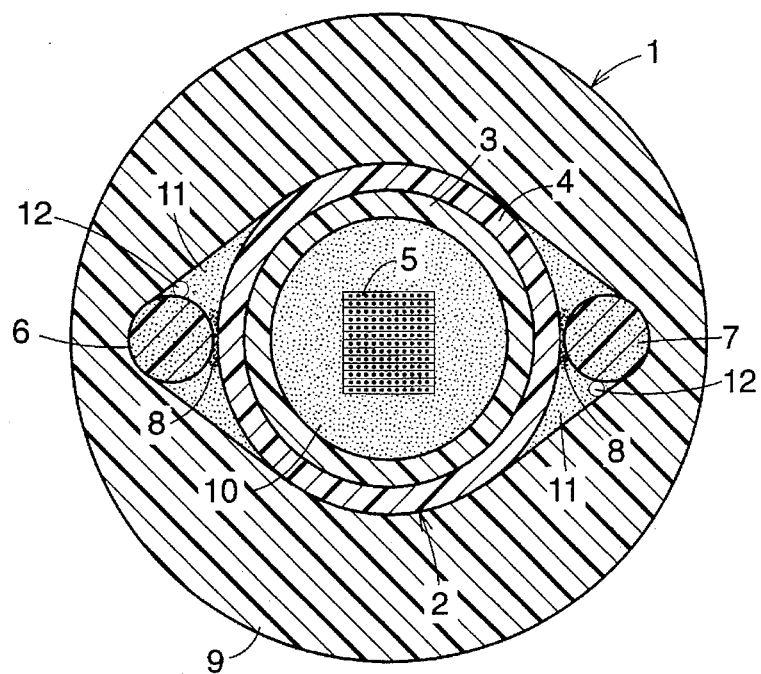
FIG. 1 is a cross-sectional view of a first embodiment of the core of the invention in which non-metallic strength members are bonded to the buffer tube encircling optical fiber ribbons.

The buffer tube of the invention can encircle optical fibers arranged in various ways, e.g. stranded or non-stranded, in oscillating lay or in plastic ribbons, but the invention will be described with optical fibers in plastic ribbons. As used herein "cross-sectional area of the optical fibers" means the area occupied by the optical fibers and any coverings or binders therefor.

Also, the buffer tube will be described as having two concentric layers of plastic, but it is to be understood that one of the layers can be omitted.

In the drawings, the strength members are shown in enlarged scale for purposes of illustration, and therefore, the wrapping of the strength members and the plastic layer around the wrapping are shown distorted more than would normally be encountered in practice. Thus, normally, the wrapping would be substantially circular in cross-section and the plastic layer around the strengthening members would be less indented by the strength members and would have an outer surface which is substantially circular in cross-section. However, the invention is not limited to circular cross-sections for such components.

FIG. 1 illustrates in cross-section an optical fiber cable core 1 with a buffer tube 2 formed by two layers 3 and 4 of a plastic material, such as polybutene terepthalate, polypropylene, polymethylpentene or polyethylene, such plastic materials having a Young's Modulus in the range from 20,000–500,000 psi, and which encircles a stack 5 of optical fiber ribbons, each of which comprises a plurality of optical fibers in side-by-side, laterally spaced relation and encased, or embedded, in a plastic material. Such ribbons are well-known in the art and each of the optical fibers usually comprises a glass central portion, e.g. silica glass, surrounded by a cladding for optical purposes and one or more coatings, e.g. plastic coatings, for physical protection purposes. The ribbons may be held in stacked relation in any conventional manner, e.g. by an adhesive or cord binders, and may be twisted around the stack 5 axis or around the axis of the tube 2 either helically or in oscillating lay. As previously mentioned, bunched, stranded or oscillating lay fibers can be used in place of the optical fiber ribbons. The layers 3 and 4 may be made of different plastic materials, and as previously mentioned, one layer, 3 or 4, can be omitted.

The buffer tube 4 has an inner bore larger than the cross-sectional area of the stack 5 and a longitudinal or axial length less than the length of the ribbons, and hence, the optical fibers, in the stack 5 so that the ribbons are free to move with respect to the buffer tube 2 and stretching of the buffer tube 2 does not apply tension to the ribbons. Preferably, the ratio of the cross-sectional area of the stack 5 to the cross-sectional area of the inner bore is about 0.5 but can be greater or less, and the lengths of the ribbons exceed the axial length of the buffer tube 2 by about 0.15% to about 0.35%, the objective being to prevent expansion and contraction of the buffer tube 2 from applying any significant forces to the ribbons.

Preferably, all the space within the buffer tube 2 is filled with a conventional water blocking material 10, such as a thixotropic grease or gel preferably have a viscosity at 20 seconds in the range from 8,000 to 25,000 cps. The material 10 can contain small particles, e.g. of a size less than about 500 microns, of a known water swellable material, such as sodium acrylate, to assist in preventing moisture from affecting the optical fibers. In addition, or in the alternative, the compound can include gas, e.g. hydrogen, absorbing compounds for also assisting in protecting the optical fibers with respect to deleterious gases. The water blocking compound 10 also assists in resisting radially inward deformation of the buffer tube 2.

In FIG. 1, two diametrically opposite, non-metallic, strength members 6 and 7 are adjacent to the buffer tube 2 and extend longitudinally of the core 1 and substantially parallel to the axis of the buffer tube 2. The strength members 6 and 7 have a tensile strength several times the tensile strength of the tube 2 and a temperature coefficient of expansion and contraction several times smaller than such coefficient of the tube 2. The strength members 6 and 7 are bonded throughout, or substantially throughout, their lengths to the outer surface of the tube 2 by adhesive 8, such as an epoxy resin or a hot melt adhesive, which serves both to resist bending or kinking of the strength members 6 and 7 when they are subjected to longitudinal compression loads and to hold them in place during subsequent handling of the core and the application of other layers of materials. The adhesive may extend part way around the outer surfaces of the strength members 6 and 7, but the strength members 6 and 7 are essentially in contact with the outer surface of the tube 2.

The strength members 6 and 7 can, for example, be flexible polymeric, non-polymeric or glass rods or glass or aramid fibers embedded in a resin, such as an epoxy resin, and because of their high tensile strength they can be relatively small in diameter, e.g. a diameter in the range from 0.75 mm to 4.5 mm. However, with such a small diameter they are relatively easily bent when they are not transversely supported. Therefore, without support which resists transverse bending or kinking of the strength members 6 and 7 when the strength members 6 and 7 are subjected to longitudinal compression forces, such as forces produced by temperature changes, the strength members 6 and 7 by themselves cannot withstand the compression forces normally encountered even though the tube 2 offers resistance to inward bending of the strength members 6 and 7. Particularly suitable strength members 6 and 7 are non-metallic strength members sold by NEPTCO, Inc., Pawtucket, R.I. under the trademark LIGHTLINE which comprise E-glass fibers in an epoxy binder. Such strength members have the following typical properties:

| | |
|---|---|
| Tensile Strength | $2.2 \times 10^5$ psi |
| Young's Modulus | $6.3 \times 10^6$ psi |
| Elongation to Break | 3.2–3.5% |
| Flexural Strength | $1.10 \times 10^5$ psi |
| Minimum Bend Radius | 55 × diameter |
| Epoxy/Glass-% by Volume | 33/67 |

The strength members 6 and 7 are tightly coupled to the buffer tube 2 both by friction therebetween and the adhesive 8 so that when the tension and compression for which the core 1 is designed are applied longitudinally to the core 1, either externally or because of thermal expansion or contraction, the strength members 6 and 7 will not slip with respect to the tube 2. The adhesive 8 and the portions of the strength members 6 and 7 bonded to the tube 2 along their lengths are selected so that the strength members 6 and 7 do not move significantly transversely to their lengths or decouple from the tube 2 when subjected to tensile and compression forces and temperature changes which the core 1 is designed to withstand.

While the adhesive 8 in the embodiment of FIG. 1 acts as both anti-compression means and as anti-decoupling means, the ability of the core shown in FIG. 1 to resist compression and decoupling of the strength members 6 and 7 from the buffer tube 2, preferably, is enhanced by encircling the combination of elements described thus far with a layer 9 of extruded plastic which presses the strength members 6 and 7 toward the tube 2 and which opposes buckling and kinking of the strength members 6 and 7. The layer 9 preferably is made of a thermoplastic such as medium density polyethylene.

Although more than two strength members in circumferentially spaced relation can be used, when only two strength members 6 and 7 are used, they are in diametrically opposite positions so that the easier bending plane of the strength members 6 and 7 is transverse, e.g. 90° to the easier bending plane of the stack 5. Thus, as shown in FIG. 1, a plane intersecting the axes of the strength members 6 and 7 is perpendicular to a plane which is perpendicular to the major surfaces of the ribbons in the stack 5 and which is parallel to the longitudinal axis of the stack 5 and hence, is parallel to such major surfaces. Preferably, also, when the stack 5 is not twisted, such plane intersecting the axis of the strength members 6 and 7 is approximately midway between the length of the major dimension of the stack 5 as shown in FIG. 1.

Although FIG. 1 shows spaces adjacent to the strength members 6 and 7 in enlarged form, there normally will be at least small, longitudinally extending such spaces, and preferably, such spaces are filled with a water blocking material 11 which can be the same as, or different from, the water blocking material within the tube 2. Thus, the water blocking material can be a grease or gel which is merely non-hygroscopic or can be both non-hygroscopic and thixotropic and can, if desired, contain the water swellable particles described hereinbefore and/or the gas absorbing compounds described hereinbefore. Preferably, the water blocking material has a viscosity in the range from 10–500 cps. at 125° C. in accordance with ASTM standard D-2669.

Although not necessary, high tensile strength cords 2, i.e. cords strong enough, when pulled, to rip open the plastic layer 9, can be disposed adjacent the strength members 6 and 7 for splicing purposes.

The core 1 described in connection with FIG. 1 by itself, i.e. without further layers, can withstand longitudinal pull forces on the core 1 of up to 600 pounds, and longitudinal compression and tension forces caused by temperature changes from −50° C. to 85° C. without damage to the optical fibers in the stack 5. Thus, the ratio of the cross-sectional area of the bore of the buffer tube 4 to the cross-sectional area of the optical fibers therewithin, the amount by which the linear length of the optical fiber ribbons exceeds the axial length of the buffer tube 4, the tensile strength of the strength members 6 and 7, the adhesive 8 and the longitudinal length of the portions of the strength members 6 and 7 bonded to the buffer tube 4 by the adhesive 8 are all selected so as to provide such characteristics.

Figure 2:
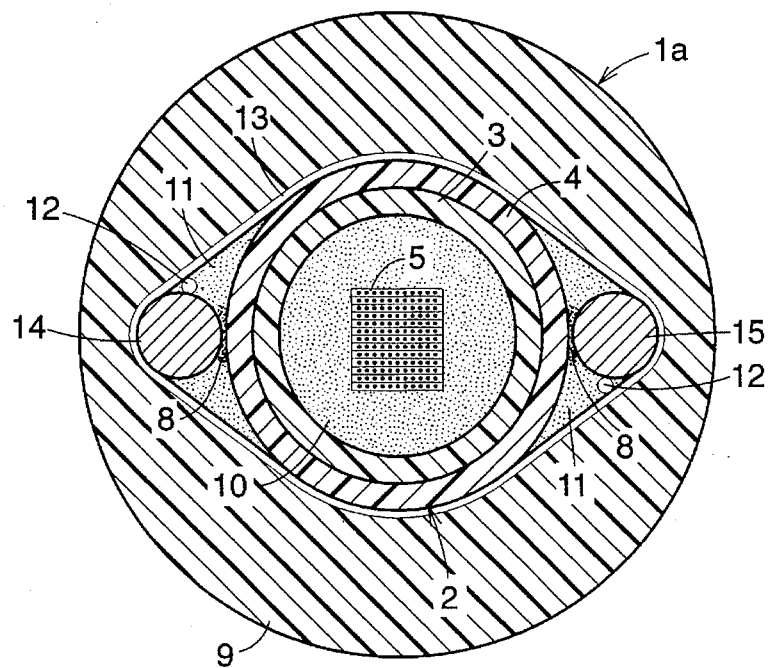
FIG. 2 is similar to FIG. 1 and shows a second embodiment in which steel wire strength members are encircled by a helically wound cord.
Figure 3:
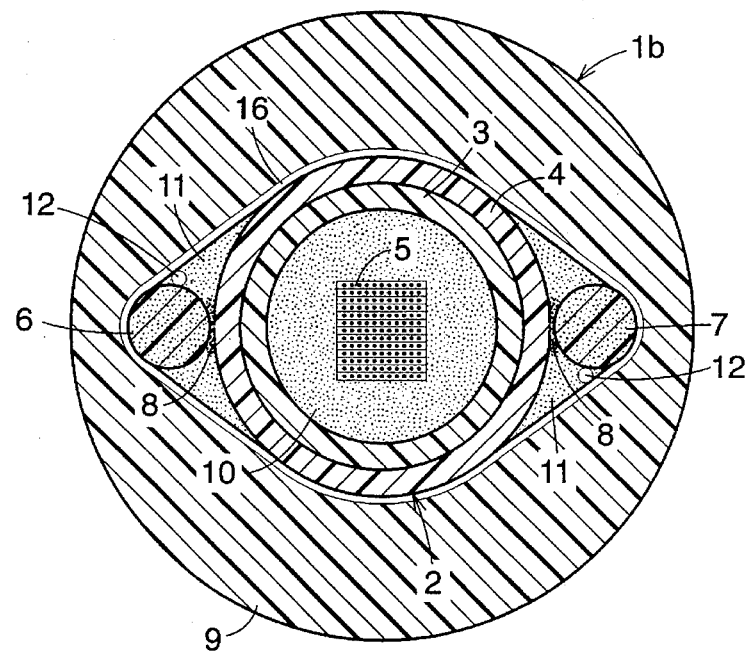
FIG. 3 is similar to FIG. 2 and shows a third embodiment in which non-metallic strength members are encircled by a helically wound tape.
Figure 4:
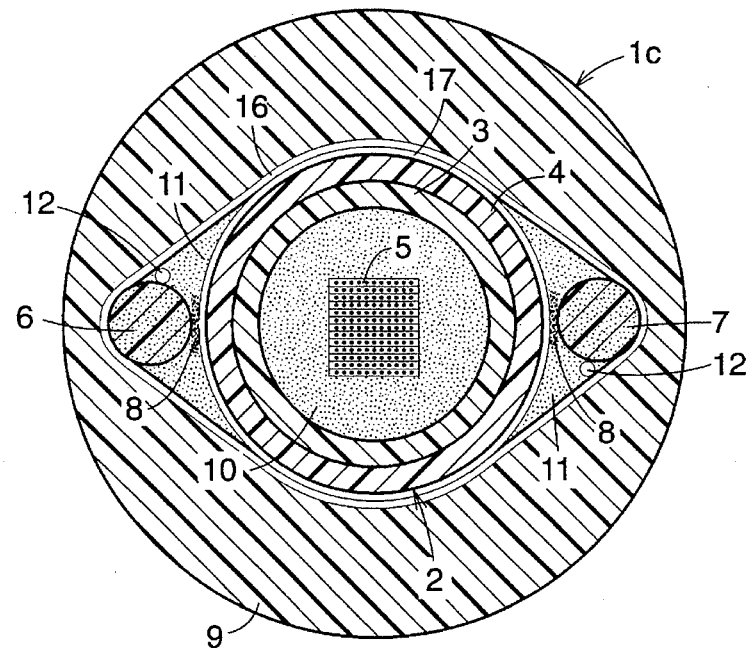
FIG. 4 is similar to FIG. 3 and shows a water blocking tape intermediate the strength members and the buffer tube.

While the embodiment of FIG. 1 provides improved compression and decoupling resistance, as compared to the prior art, a greater resistance to compression and decoupling can be obtained by wrapping the strength members with a cord or tape under tension. FIGS. 2–4 illustrate embodiments of the core in which such cord or tape is used, FIG. 2 illustrating a cord wrapping of metallic strength members, FIG. 3 illustrating a tape wrapping of non-metallic strength members and FIG. 4 illustrating a tape wrapping of non-metallic strength members. However, a cord can be substituted for the tape and vice versa in any of the embodiments in FIGS. 2–4.

The embodiment of the core 1a illustrated in FIG. 2 is the same as the embodiment shown in FIG. 1 except for the addition of a wrapping of a cord 13 and the use of metallic strength members 14 and 15 in place of non-metallic strength members 6 and 7, and corresponding parts have the same reference numerals. If preferred, the non-metallic strength members 6 and 7 can be used in place of the metallic strength members 14 and 15. As used herein, the word "cord" is intended to include a monolithic fiber, a thread or a yarn which has the desired strength and a flexibility which will permit it to be wound around the strength members 6 and 7.

The metallic strength members 14 and 15, which also provide resistance to compression because of their lateral support by the cord 13 can, for example, be stainless steel wires, or carbon steel wires coated with copper or zinc for corrosion purposes. The diameter of the wires can be in the range from 0.04 inch to about 0.120 inch since they have a high tensile strength, e.g. in the range from about 180,000 psi to about 221,000 psi. With such a small diameter, they are relatively flexible and cannot, in relatively long lengths, withstand significant compression forces without lateral or transverse support.

To provide such lateral support, i.e. anti-compression means, the strength members 14 and 15 are wrapped with a cord 13 wound helically around the strength members 14 and 15 with the cord 13 under tension, e.g. a tension in the range from about 200 grams to about 2,000 grams and preferably, in the range from about 600 to about 1,500 grams. The cord 13 can be made of polyester, nylon, aramid or fiberglass preferably of a diameter not greater than about 2 mm, and preferably, has a tensile strength at break of at least 6,000 psi. Although the cord 13 could be wound with abutting turns, this would decrease the speed of manufacture of the core 1a and is not necessary for resisting buckling or kinking of the strength members 14 and 15 when subjected to normal compression forces. The spacing between turns of the cord 13 can be in the range from about 7 mm to about 20 mm for the strength members 14 and 15 described, but the actual spacing of the turns depend upon the flexibility of the strength members 14 and 15 and the longitudinal compression forces applied thereto.

Thus, the anti-compression means, the cord 13, applies radially inward forces to the strength members 14 and 15, and the number of portions of the strength members 14 and 15 contacted by the cord 13, and hence, the longitudinal spacing of the turns, as well as the tension under which the cord is wound, and hence, the transverse forces applied to such portions by such cord, are selected so as to prevent significant movement of the strength members 14 and 15 transversely of their lengths and decoupling of the strength members from the buffer tube 2 when said core 1a is subjected to a tension force longitudinally thereof of up to at least 600 pounds and is subjected to a temperature change from −50° C. to 85° C.

Of course, if desired, there may be additional layers of the cord 13 over the layer of cord 13 shown in FIG. 2. Preferably, successive layers of the cord 13 are wound helically in opposite directions.

Because the cord 13, by itself, can provide the necessary compression and decoupling resistance, the adhesive 8 can be omitted unless it is desired for maintaining the strength members 14 and 15 in place during handling of the buffer tube 2 with the strength members 14 and 15 thereon or the application of layers thereto subsequently.

The embodiment of the core 1b illustrated in FIG. 3 is the same as the embodiment shown in FIG. 2 except for the replacement of the helically wound cord 13 by a helically wound tape 16 and the substitution of non-metallic strength members 6 and 7 for the metallic strength members 14 and 15. Of course, metallic strength members 14 and 15 can be used in place of the non-metallic strength members 6 and 7.

The tape 16 can be any tape having the desired strength properties, i.e. a tensile strength at break such as 6000 psi. For example, the tape 16 can be a commercially available polyester tape having a thickness about 0.020 mm to about 0.030 mm and of various widths, preferably not greater than 1 inch in width. The tape 16 can be applied in several layers, successive layers being wound helically in opposite directions.

The criteria for the number of portions of the strength members 6 and 7 contacted by the tape 16, the transverse forces applied to the members 6 and 7 and the relationship of the buffer tube 2 to the optical fibers are the same as those described in connection with FIG. 2. Similarly to the embodiment illustrated in FIG. 2, the adhesive 8 can be omitted unless desired for holding the strength members 6 and 7 in place during subsequent manufacturing operations.

The embodiment of the core 1b illustrated in FIG. 4 is the same as the embodiment illustrated in FIG. 3 except for the addition of a known type of water swellable tape 17 for the purpose of providing additional moisture protection for the core 1c. In the embodiment of FIG. 4, metallic strength members 14 and 15 may be substituted for the strength members 6 and 7 and a cord 13 can be substituted for the tape 16.

The water swellable tape 17 comprises two perforate layers which have water swellable particles therebetween, an example of such tape 17 being the one sold by West Point Pepperel, West Point, Ga. under the trademark FIRET. Although the tape 17 is between the strength members 6 and 7 and the buffer tube 2, the tape 17 does not decrease the coupling between the strength members 6 and 7 and the buffer tube 2 significantly. As in previously described embodiments, the adhesive 8 can be omitted if not desired for maintaining the strength members 6 and 7 in position. The tape 17 can be helically wound around the tube 2 or can be longitudinally folded therearound.

Figure 5:
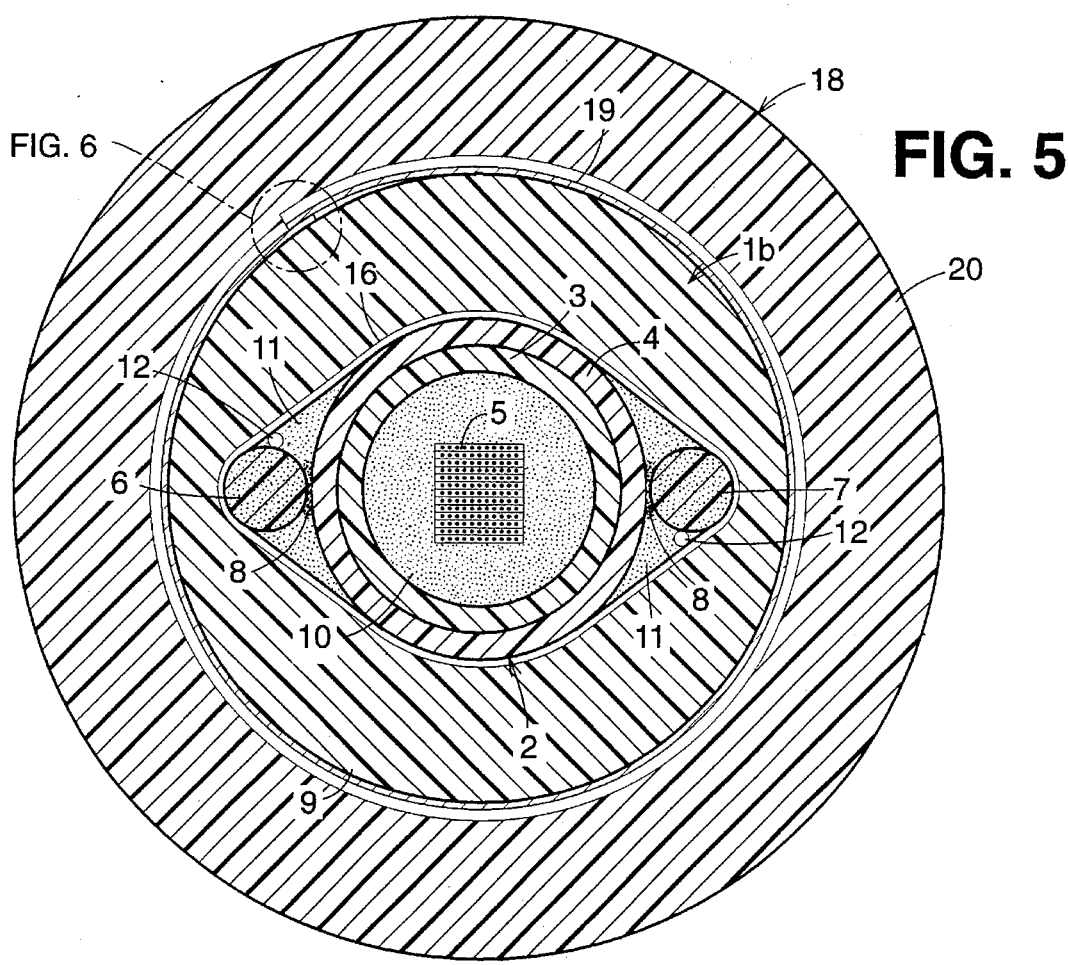
FIG. 5 is a cross-sectional view which shows the core of FIG. 3 incorporated in an optical fiber cable.

FIG. 5 illustrates the core 1b incorporated in an optical fiber cable 18 which includes layers of various materials surrounding the core 1b. The cores 1a and 1c can be substituted for the core 1b.

Figure 6:
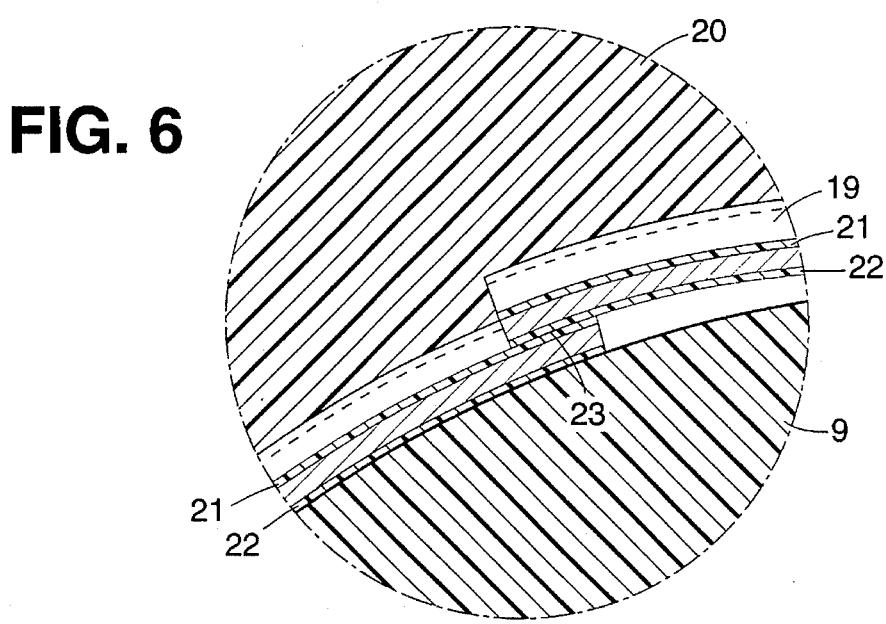
FIG. 6 is an enlarged, fragmentary view of a portion of FIG. 5 at the overlapping portions of the metal shield.

In the preferred embodiment of the cable 18 illustrated in FIG. 5, the core 1b is encircled by one or more layers of a metal shield 19, only one layer of such shield being shown, which provides rodent and other protection. The shield 19 can be corrugated or uncorrugated, a corrugated shield 19 being shown, and preferably, the shield 19 is a steel tape longitudinally folded around the core 1b with overlapping edges as shown in greater detail in FIG. 6. Of course, the metal shield 19 adds further tensile strength to the cable 18, but it is not relied upon to provide further tensile strength. However, being relatively thin, e.g. a tape thickness of about 0.006 in., it does not provide significant resistance to compression even though it is encircled by a plastic jacket 20, which can, for example, be made from a medium density polyethylene plastic. Being made of plastic, the jacket 20 has a relatively low tensile strength and a relatively high coefficient of expansion as compared to the strength members 6 and 7, or if used, the strength members 14 and 15. When the shield 19 is corrugated, it has a relatively low resistance to longitudinal compression depending upon the depth of the corrugations.

Preferably, the shield 19 is coated on both sides with a plastic, the coatings being designated by the reference numerals 21 and 22, but the shield 19 can be coated with plastic on only one side. Preferably, the plastic of the coatings 21 and 22 is selected so that the inner coating 22 will bond to the plastic layer 9, the outer coating 21 will bond to the plastic layer 20 and the overlapping edge portions of the shield 19 will bond together at 23 (see FIG. 6) when the plastic layer 20 is extruded over the shield 19. If desired or necessary to seal the overlapping edge portions of the shield 19, an adhesive can be used between such portions, i.e. at 23.

A satisfactory steel tape for the shield 19 can be obtained from the Dow Chemical Company, Midland, Mich., under the trademark ZETABON. The tape is a carbon steel tape coated on both sides with an adherent ethylene copolymer. The tape thickness is about 0.006 in. and the thickness of the coatings is about 0.0023 in. The yield strength is stated to be about 530 sq.in/lb., and it is supplied in widths from ½ in. to 12 in.

Of course, the cable 18 with the core 1a, 1b or 1c therein has pull force and compression characteristics at least as good as the core therein. However, both the shield 19 and the jacket 20 increase the resistance of the strength members 6 and 7 or 14 and 15 to buckling or kinking.

Figure 7:
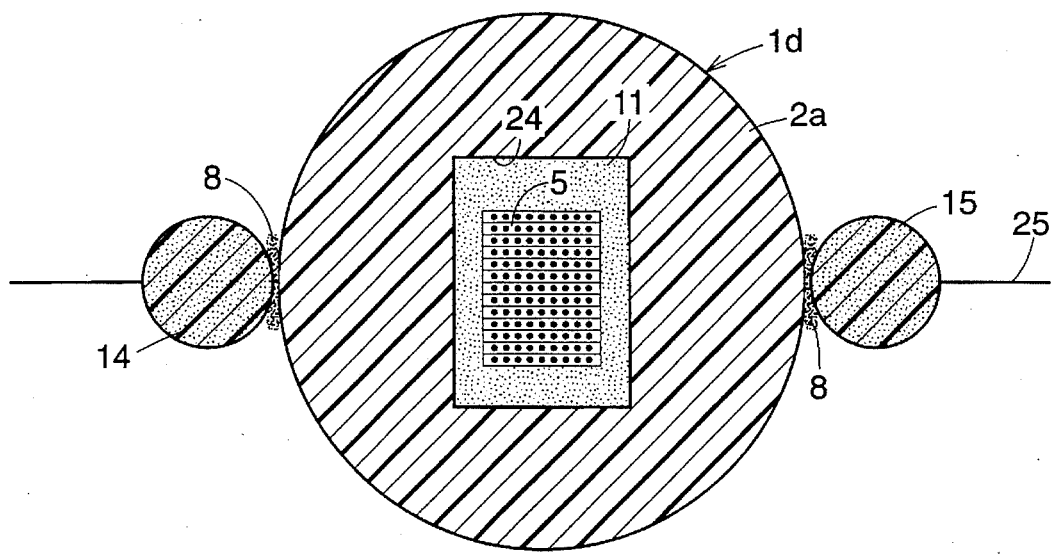
FIG. 7 is a cross-sectional view of a modified form of the buffer tube which can be used in the embodiments of FIGS. 1–5 in association with a pair of strength members, the buffer tube having a rectangular bore.

It can be desirable to limit twisting of the optical fiber containing ribbons in the stack 5 with respect to the buffer tube. FIG. 7 illustrates a buffer tube 2a, corresponding to the buffer tube 2 which has a bore 24 corresponding in shape, but larger than, the stack 5. Thus, the cross-sectional area of the bore 24 in relation to the cross-sectional area of the stack 5 is selected as described for the circular bore of the buffer tube 2 and the stack 5, but the narrower dimension, e.g. the width dimension in FIG. 7, of the bore 24 is selected so that the stack 5 can twist about its axis by only a small amount, e.g. 30°. As shown in FIG. 7, the width dimension of the bore 24 is less than the height dimension of the stack 5, but can be only less than the diagonal, or corner-to-corner dimension of the stack 5. In other words, both the cross-section of the bore 24 and the cross-section of the stack 5 are non-circular and are dimensioned so that there is space between the stack 5 and the wall of the bore which meets the requirements for the space between the stack 5 and the wall of the bore of the buffer tube 2, as described hereinbefore, but the relative dimensions of the stack 5 and the bore 24 are such that the stack 5 is limited in twisting with respect to the tube 2a to less than about 30°.

When the stack 5 and the walls of the bore 24 are aligned as shown in FIG. 7, a plane 25 intersecting the axes of the strength members 14 and 15 is substantially parallel to the major surfaces of the ribbons in the stack 5 and preferably, is approximately mid-way of the height of the stack 5.

Figure 8:
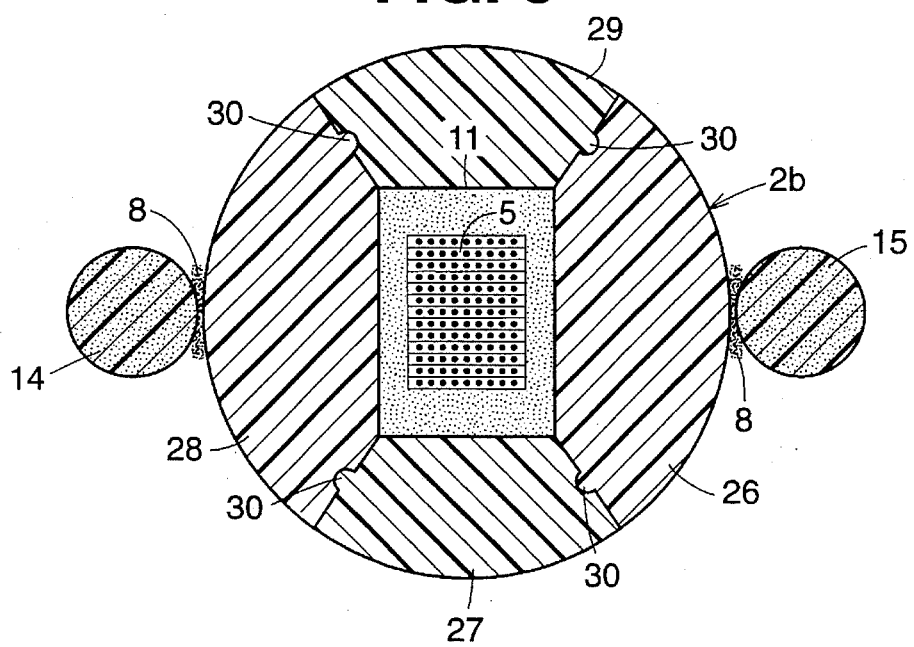
FIG. 8 is a cross-sectional view of a modified form of the buffer tube shown in FIG. 7.

For convenience in manufacture, the buffer tube can comprise a plurality of plastic segments 26. Thus, the buffer tube 2b shown in FIG. 8 has four segments 26–29 and preferably, the segments 26–29 are interlocked by projections 30 which extend longitudinally of the segments 26–29 and extend into longitudinal recesses formed in adjacent segments.

Typically, in designing a cable of the invention, the outside diameter, the pull to which the cable will be subjected and the temperature range of operation are established, such as by the user. From this, one skilled in the art knowing from experience the required minimum thickness for the jacket 20 and the buffer tube 2, 2a or 2b, which can be of the order of a few millimeters, the required thickness of the shield 19, the diameters of the strength members 6 and 7 or 14 and 15 required for tensile strength and the diameters of the cord 13 or the thickness of the tape 16 which is required to withstand buckling of the strength members, one skilled in the art can determine the dimensions of the bore of the buffer tube and the number of optical fibers, e.g. the number of ribbons, which can be contained in the bore and the length thereof in relation to the length of the buffer tube so as to provide the desired space requirements and prevention of damage to the optical fibers.

With these matters determined, the winding of the strength members with the core or tape and the tension with which they are wound and/or the application of the adhesive and its characteristics which are needed to provide the necessary compression resistance can be determined.

Similar considerations apply to the design of a core without a surrounding metal shield 19 and a jacket Although preferred embodiments of the present invention have been described and illustrated, it will be apparent to those skilled in the art that various modifications may be made without departing from the principles of the invention.

What is claimed is:

1. An optical fiber cable core comprising:

a plastic tube encircling a plurality of optical fibers, said tube having a bore of a cross-sectional area larger than the cross-sectional area of said fibers and a longitudinal axis shorter than the lengths of said fibers, whereby said fibers are free to move with respect to said tube;

at least two elongated, strength members having a tensile strength greater than the tensile strength of said tube and a thermal coefficient of expansion and contraction less than such coefficient of said tube and being spaced apart circumferentially of said tube and coupled to said tube with their lengths substantially parallel to said axis of said tube, said strength members, in free space, being flexible transversely to their lengths and being unable, without transverse support other than said tube, to provide the resistance to longitudinal compression necessary to prevent damage to said optical fibers because the strength members would bend transversely to their lengths and slide relative to said tube; and anti-compression means for increasing the resistance of said strength members to compression axially of the cable, said anti-compression means coupling said strength members to said tube and applying forces to said strength members transversely to their lengths and directed toward said tube, said forces being sufficient to prevent significant bending of said strength members away from said tube when they are subjected to longitudinal compression due to temperature changes where the cable is installed and at at least portions thereof along their lengths, the number of said portions and the longitudinal spacing thereof as well as said forces applied to said strength members, the ratio of the cross-sectional area of said optical fibers to the cross-sectional area of said bore, the amount by which the length of said optical fibers exceeds the axial length of said tube and the tensile strength of said strength members being selected to prevent significant movement of said strength members transversely to their lengths and significant longitudinal movement of said strength members with respect to said tube when predetermined tensile forces encountered during handling and installation are applied longitudinally of said core and when said core is subjected to predetermined temperature changes where the cable is installed.

2. An optical fiber cable core as set forth in claim 1 wherein said predetermined tensile forces are up to about 600 lbs.

3. An optical fiber cable core as set forth in claim 1 wherein the range of said predetermined temperature changes is from about −10° C. to about 65° C.

4. An optical fiber cable core as set forth in claim 1 wherein the range of said predetermined temperature change is from about 50° C. to about 85° C.

5. An optical fiber cable core as set forth in claim 1 wherein said predetermined tensile forces are up to about 600 lbs. and the range of said predetermined temperature changes has a lower limit of from about −10° C. to about −50° C. and an upper limit of from about 65° C. to about 85° C.

6. An optical fiber cable core as set forth in claim 1 wherein said anti-compression means comprises an adhesive bonding said strength members to said tube.

7. An optical fiber cable core as set for in claim 1 wherein said optical fibers are contained in optical fiber ribbons disposed in a stack.

8. An optical fiber cable core as set forth in claim 7 wherein the axes of said two strength members lie in a plane substantially parallel to the major surfaces of said ribbons.

9. An optical fiber cable core as set forth in claim 1 wherein said strength members are metal strength members.

10. An optical fiber cable core as set forth in claim 1 wherein said strength members are non-metallic strength members.

11. An optical fiber cable core as set forth in claim 1 wherein any otherwise empty spaces within said bore of said tube are filled with a water blocking compound.

12. An optical fiber cable core as set forth in claim 11 wherein said water blocking compound includes a gas absorbing compound.

13. An optical fiber cable core as set forth in claim 11 wherein said water blocking compound includes water swellable particles.

14. An optical fiber cable core as set forth in claim 13 wherein said water swellable tape is intermediate said stength members and said tube.

15. An optical fiber cable core as set forth in claim 1 further comprising a water swellable tape containing water swellable particles adjacent to and contacting said strength members.

16. An optical fiber cable core as set forth in claim 15 wherein said water swellable tape is longitudinally folded around one of said strength members and of said tube.

17. An optical fiber cable comprising the optical fiber core of claim 1 and further comprising a layer of plastic material encircling said strength members.

18. An optical fiber cable as set forth in claim 17 further comprising a water blocking compound in any otherwise empty spaces between said layer of plastic material and said tube.

19. An optical fiber cable as set forth in claim 17 further comprising at least one metal shield encircling said layer of plastic.

20. An optical fiber cable as set forth in claim 19 wherein said metal shield is longitudinally folded around said layer of plastic.

21. An optical fiber cable as set forth in claim 20 wherein said metal shield is corrugated.

22. An optical fiber cable as set forth in claim 20 wherein said metal shield has overlapping, longitudinally extending edge portions which are bonded to each other.

23. An optical fiber cable as set forth in claim 19 wherein said metal shield has a coating of plastic material on at least one surface thereof.

24. An optical fiber cable as set forth in claim 23 wherein said metal shield has a plastic coating on both surfaces thereof, one of said coatings being bonded to said layer of plastic material.

25. An optical fiber cable as set forth in claim 19 further comprising a jacket of plastic material encircling said metal shield.

26. An optical fiber cable as set forth in claim 25 wherein said metal shield has a coating of plastic material on the surface thereof adjacent said jacket which is bonded to said jacket.

27. An optical fiber cable as set forth in claim 26 wherein said metal shield has a coating of plastic material on the surface thereof adjacent said layer of plastic material which is bonded to said layer of plastic material.

28. An optical fiber cable core comprising:

a plastic tube surrounding a plurality of optical fibers, said tube having a bore of a cross-sectional area larger than the cross-sectional area of said fibers and a longitudinal axis shorter than the lengths of said fibers, whereby said fibers are free to move with respect to said tube;

at least two elongated, strength members having a tensile strength greater than the tensile strength of said tube and a thermal coefficient of expansion and contraction less than such coefficient of said tube and being disposed adjacent to said tube with their lengths substantially parallel to said axis of said tube, said strength members, in free space, being flexible transversely to their lengths and being unable, without transverse support other than said tube, to provide the resistance to longitudinal compression necessary to prevent damage to said optical fibers; and anti-compression means for increasing the resistance of said strength members to compression, said anti-compression means coupling said strength members to said tube and applying forces to said strength members transversely to their lengths and at at least portions thereof along their lengths, the number of said portions and the longitudinal spacing thereof as well as said forces applied to said strength members, the ratio of the cross-sectional area of said optical fibers to the cross-sectional area of said bore, the amount by which the length of said optical fibers exceeds the axial length of said tube and the tensile strength of said strength members being selected to prevent significant movement of said strength members transversely to their lengths and significant longitudinal movement of said strength members with respect to said tube when predetermined tensile forces encountered during handling and installation are applied longitudinally of said core and when said core is subjected to predetermined temperature changes where the cable is installed;

said anti-compression means comprising an elongated member helically wound around said strength members under tension sufficient to provide said forces applied to said strength members.

29. An optical fiber cable core as set forth in claim 28 wherein said elongated member is a cord with spacing between helical turns of said cord.

30. An optical fiber cable core as set forth in claim 29 wherein said cord has a tensile strength of at least 6000 lbs. and is under a tension of between about 200 grams and 2000 grams.

31. An optical fiber cable core as set forth in claim 10 wherein the spacing between the turns of said cord is in the range of about 7 mm to about 20 mm.

32. An optical fiber cable core as set forth in claim 31 wherein said tension is in the range from about 600 grams to about 1500 grams.

33. An optical fiber cable core as set forth in claim 28 wherein said elongated member is a tape.

34. An optical fiber cable core as set forth in claim 33 wherein said tape has a tensile strength of at least 6000 lbs and is under a tension of between about 200 grams and 2000 grams.

35. An optical fiber cable core comprising:

a plastic tube surrounding a plurality of optical fibers, said tube having a bore of a cross-sectional area larger than the cross-sectional area of said fibers and a longitudinal axis shorter than the lengths of said fibers, whereby said fibers are free to move with respect to said tube;

at least two elongated, strength members having a tensile strength greater than the tensile strength of said tube and a thermal coefficient of expansion and contraction less than much coefficient of said tube and being disposed adjacent to said tube with their lengths substantially parallel to said axis of said tube, said strength members, in free space, being flexible transversely to their lengths and being unable, without transverse support other than said tube, to provide the resistance to longitudinal compression necessary to prevent damage to said optical fibers; and anti-compression means for increasing the resistance of said strength members to compression, said anti-compression means coupling said strength members to said tube and applying forces to said strength members transversely to their lengths and at at least portions thereof along their lengths, the number of said portions and the longitudinal spacing thereof as well as said forces applied to said strength members, the ratio of the cross-sectional area of said optical fibers to the cross-sectional area of said bore, the amount by which the length of said optical fibers exceeds the axial length of said tube and the tensile strength of said strength members being selected to prevent significant movement of said strength members transversely to their lengths and significant longitudinal movement of said strength members with respect to said tube when predetermined tensile forces encountered during handling and installation are applied longitudinally of said core and when said core is subjected to predetermined temperature changes where the cable is installed;

said optical fibers being contained in optical fiber ribbons disposed in a stack, the cross-section of said stack being non-circular and said bore of said tube is non-circular, the dimensions of said stack and said bore being selected so that the rotation of said stack about the axis of said stack is limited by the walls of said bore.

36. An optical fiber cable core as set forth in claim 35 wherein said stack and said bore are rectangular in cross-section and the dimensions thereof are selected so that the rotation of said stack is limited to not more than about 30°.

37. An optical fiber cable core comprising:

a plastic tube surrounding a plurality of optical fibers, said tube having a bore of a cross-sectional area larger than the cross-sectional area of said fibers and a longitudinal axis shorter than the lengths of said fibers, whereby said fibers are free to move with respect to said tube;

at least two elongated, strength members having a tensile strength greater than the tensile strength of said tube and a thermal coefficient of expansion and contraction less than such coefficient of said tube and being disposed adjacent to said tube with their lengths substantially parallel to said axis of said tube, said strength members, in free space, being flexible transversely to their lengths and being unable, without transverse support other than said tube, to provide the resistance to longitudinal compression necessary to prevent damage to said optical fibers; and anti-compression means for increasing the resistance of said strength members to compression, said anti-compression means coupling said strength members to said tube and applying forces to said strength members transversely to their lengths and at at least portions thereof along their lengths, the number of said portions and the longitudinal spacing thereof as well as said forces applied to said strength members, the ratio of the cross-sectional area of said optical fibers to the cross-sectional area of said bore, the amount by which the length of said optical fibers exceeds the axial length of said tube and the tensile strength of said strength members being selected to prevent significant movement of said strength members transversely to their lengths and significant longitudinal movement of said strength members with respect to said tube when predetermined tensile forces encountered during handling and installation are applied longitudinally of said core and when said core is subjected to predetermined temperature changes where the cable is installed;

said anti-compression means comprising an adhesive bonding said strength members to said tube; and an elongated member helically wound around said stength members under tension sufficient to provide, with said adhesive, said forces applied to said strength members.

\* \* \* \* \*

UNITED STATES PATENT AND TRADEMARK OFFICE
CERTIFICATE OF CORRECTION

PATENT NO. : 5,509,097
DATED : April 16, 1996
INVENTOR(S) : Tondi-Resta et al

It is certified that error appears in the above-indentified patent and that said Letters Patent is hereby corrected as shown below:

```
Col. 2, line 64, after "forces" insert a
    comma (,);
Col. 12, line 15, after "jacket" insert --20--;

Col. 15, line 16, change "much" to --such--.
```

Signed and Sealed this

Fifth Day of November, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,509,097
DATED : April 16, 1996
INVENTOR(S) : Tondi-Resta et al

It is certified that error appears in the above-indentified patent and that said Letters Patent is hereby corrected as shown below:

Col. 1, line 44, cancel "a" and after "small" insert --a--;

Col. 13, line 6, before "50°C" insert a minus sign (-);

Signed and Sealed this

Nineteenth Day of November, 1996

*Attest:*

BRUCE LEHMAN

*Attesting Officer*  *Commissioner of Patents and Trademarks*